(12) United States Patent
Shen et al.

(10) Patent No.: US 8,646,930 B2
(45) Date of Patent: Feb. 11, 2014

(54) BACKLIGHT MODULE AND DISPLAY DEVICE THEREOF

(75) Inventors: Wei-Tai Shen, Hsin-Chu (TW); Su-Yi Lin, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 1 day.

(21) Appl. No.: 13/542,621

(22) Filed: Jul. 5, 2012

(65) Prior Publication Data

US 2013/0050989 A1    Feb. 28, 2013

(30) Foreign Application Priority Data

Aug. 31, 2011   (TW) .................................. 100131364

(51) Int. Cl.
*G09F 13/04* (2006.01)

(52) U.S. Cl.
USPC ...................... 362/97.1; 362/800; 362/249.01

(58) Field of Classification Search
USPC ................... 362/97, 611, 249.01, 249.02, 800
See application file for complete search history.

(56) References Cited

U.S. PATENT DOCUMENTS

| | | | |
|---|---|---|---|
| 6,898,012 B2 | 5/2005 | Kaminsky et al. | |
| 7,229,193 B2 * | 6/2007 | Jeon | 362/225 |
| 7,637,641 B2 * | 12/2009 | Choi et al. | 362/346 |
| 7,682,059 B2 * | 3/2010 | Choi et al. | 362/560 |
| 8,439,518 B2 * | 5/2013 | Kasai | 362/225 |
| 2005/0063172 A1 * | 3/2005 | Torihara | 362/31 |
| 2006/0187672 A1 | 8/2006 | Choi et al. | |
| 2010/0182514 A1 | 7/2010 | Kuromizu et al. | |
| 2010/0302135 A1 | 12/2010 | Larson et al. | |
| 2012/0105764 A1 * | 5/2012 | Yokota | 349/61 |
| 2013/0070170 A1 * | 3/2013 | Namekata | 348/836 |

FOREIGN PATENT DOCUMENTS

| | | |
|---|---|---|
| CN | 1821851 A | 8/2006 |
| CN | 101688649 A | 3/2010 |
| TW | I322310 B | 5/2007 |

OTHER PUBLICATIONS

English translation of abstract of TW I322310B.
China Office Action dated Jan. 5, 2013.

\* cited by examiner

*Primary Examiner* — Tracie Y Green
(74) *Attorney, Agent, or Firm* — McClure, Qualey & Rodack, LLP

(57) ABSTRACT

A backlight module and a display device including the backlight module are provided. The backlight module includes a reflective plate and a plurality of light sources, wherein the reflective plate has a reflective surface and the light sources are disposed on the reflective surface generating light in a direction away from the reflective surface. The reflecting surface includes a plurality of low reflection portions, wherein the reflectivity of the low reflection portion is lower than the reflectivity of other positions on the reflective surface. The low reflection portions are disposed between the light source and adjacent light sources.

20 Claims, 10 Drawing Sheets

BACKLIGHT MODULE AND DISPLAY DEVICE THEREOF

BACKGROUND

1. Technical Field

The present invention generally relates to a backlight module and a display device thereof. Particularly, the present invention relates to a reflective plate of a backlight module.

2. Description of the Prior Art

Technologies are being developed daily, with the optoelectronics industry continuously researching and developing greener and brighter lighting sources. For instance, light-emitting diodes (LED), which have advantages of saving energy while producing little heat, have become the common lighting source by replacing conventional lighting devices. LEDs are also being applied to various fields, such as flash lights, lamps, display devices, advertisement boards, as well as the outer walls of buildings. From this, it can be seen that LEDs are deeply entrenched in modern life. For example, liquid crystal displays utilizing backlights with LEDs have gradually become indispensible electronic products in households as they not only greatly cut down on the power usage rates, but also maintain excellent picture quality.

Referring to FIG. 1A, FIG. 1A illustrates a side-view of a conventional liquid crystal display (LCD) employing a backlight module with direct lighting. Typically, conventional backlight modules include an optical film 1A, a diffuser plate 1B, a plurality of light sources 1D where each light source 1D has a lens 1C, and a reflective plate 1E, wherein the light source 1D is a LED disposed on the reflective plate 1E. The optical film 1A and the diffuser plate 1B can increase light smoothness as well as improve optical performance. In practice, light originating from the light source 1D will travel in the direction of the arrow in FIG. 1 towards the diffuser plate 1B due to the shape of the lens 1C.

However, there are still many deficiencies with conventional displays using LEDs as light sources. Referring to both FIGS. 1A and 1B, FIG. 1B illustrates a top view of the conventional backlight module. As shown in FIGS. 1A and 1B, the light sources 1D is organized on the reflective plate 1E in a grid-like manner, surrounding the center areas 1F. In practice, due to the fact that the lens 1C increases the light-emitting angle (ie. range of degree at which light is emitted) of the light source 1D such that light may be emitted towards the side directions, light from the light source 1D will overlap with light from adjacent light sources 1D. The overlapping light over each will cause each center area 1F to produce bright spots. In cases of slim/thin backlight modules wherein the space between the diffuser plate 1B and the light sources 1D is decreased, this bright spot phenomenon is even more pronounced.

In order to overcome the bright spot problem, manufacturers have resorted to increasing the number of light sources 1D to increase the light density. However, although this method shrinks the space between light sources 1D, the material cost as well as the overall weight of the product has also correspondingly increased as a consequence. As modern displays continually trend toward larger dimensions, a solution is necessary to solve the increased material cost and product weight problem. Furthermore, some manufacturers have also resorted to trying to reengineer the diffuser plate 1B through ink printing methods to improve the light smoothness. However, larger dimension displays (e.g. displays with dimensions greater than 71 inch) are not able to utilize diffuser plates 1B formed through ink printing methods. As such, this method still does not overcome the mentioned bright spots problem.

In other words, although LEDs are bright and stable sources of light, the underlying problem of light generated from LEDs being uneven over the entire display needs to be improved in order to increase the display quality.

SUMMARY

The backlight module includes a reflective plate and a plurality of light sources, wherein the reflective plate has a reflective surface. The plurality of light sources are disposed on the reflective surface, emitting light in a direction away from the reflective surface. The reflective surface includes a plurality of low reflection portions, wherein the low reflection portions are disposed within an area between the light source and adjacent light sources. The low reflection portions have reflectivity lower than the reflectivity of other positions on the reflective surface.

The light sources may be distributed in a lattice pattern and disposed on nodes of the lattice pattern with each low reflection portion being disposed within a lattice of the lattice pattern. In addition, the low reflection portion includes at least an opening. In other words, the opening does not have the reflective properties of the reflective surface. The low reflection portions have a reflectivity lower than the reflectivity of other positions on the reflective surface.

The low reflection portions are disposed in the center of each lattice of the lattice pattern. Since light from the light source, through reflection from other optical components, is easily concentrated at the center to form bright spots, the present invention provides low reflection portions at the center to decrease the reflection of light, whereby eliminating the bright spots in order to improve the unevenness of light emanating from the display device.

DETAILED DESCRIPTION

A backlight module and a display device are provided to improve the phenomenon of light unevenness. In a embodiment, the backlight module is a light-emitting diode (LED) backlight module.

Figure 1A:
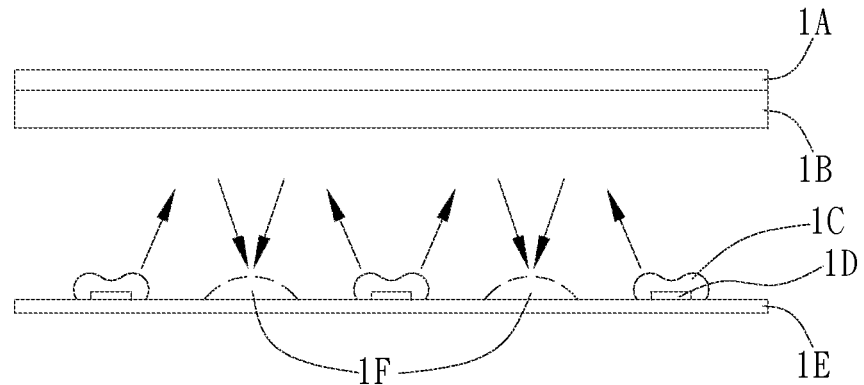
FIG. 1A is a side view of a conventional liquid crystal display utilizing a direct-light backlight module.
Figure 1B:
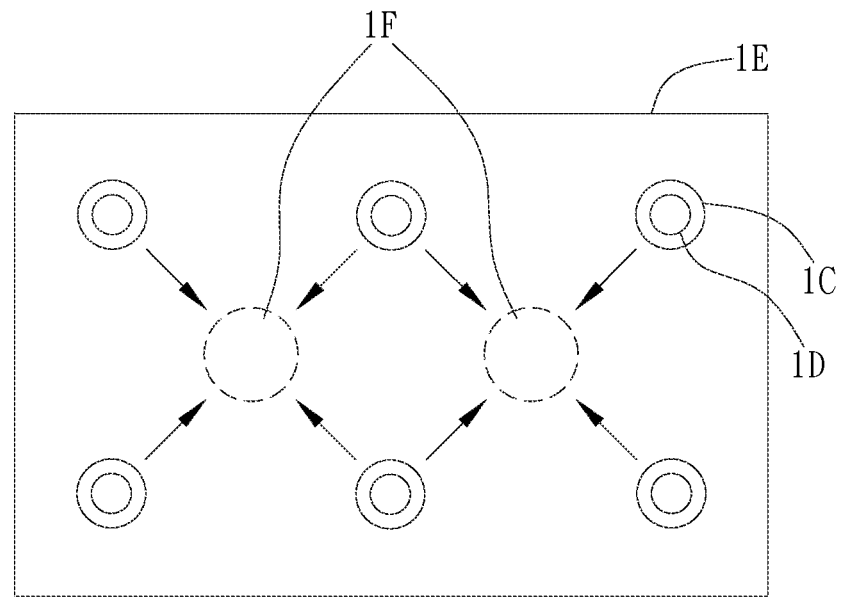
FIG. 1B is a top view of a conventional backlight module.
Figure 2:
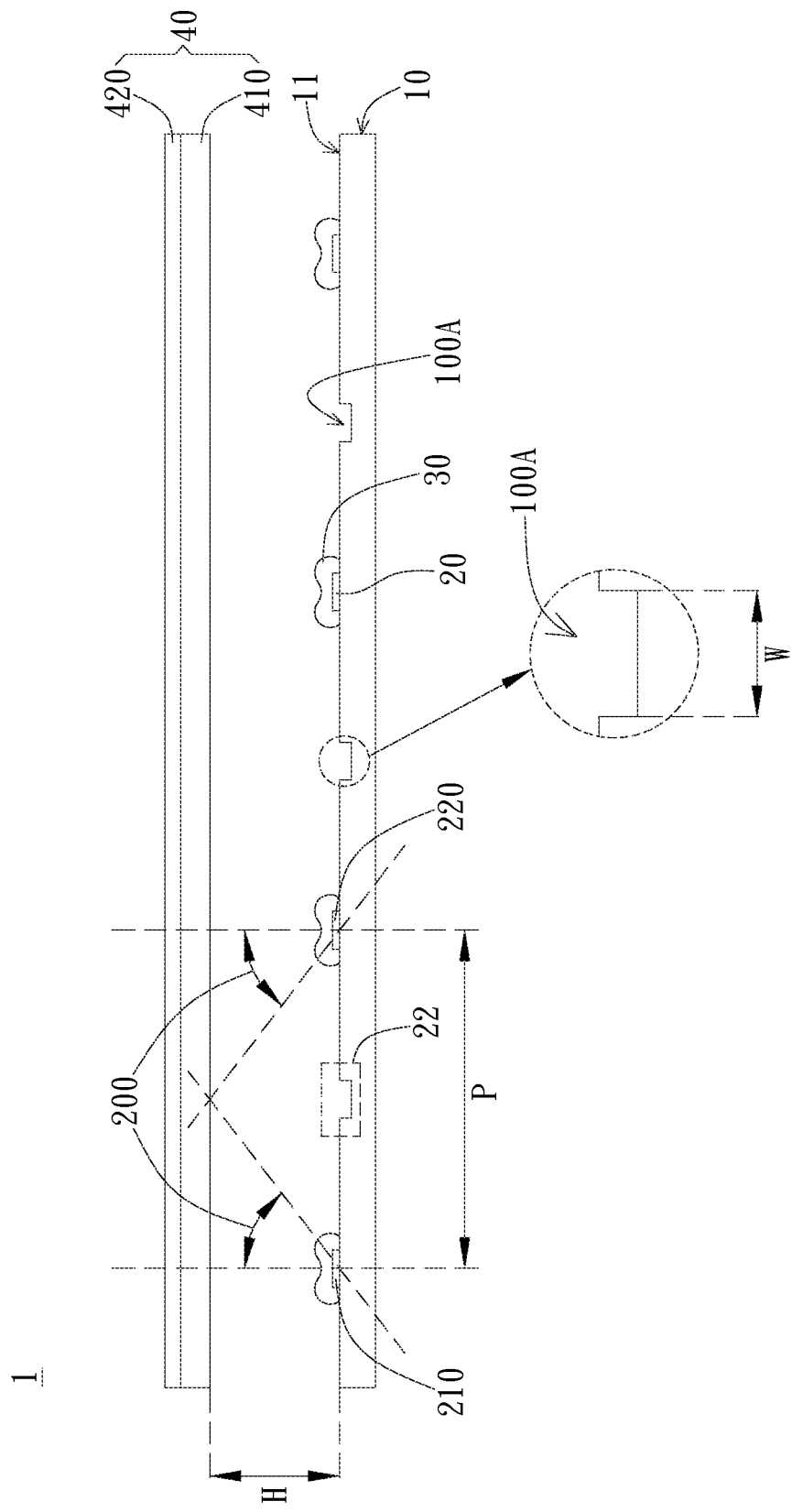
FIG. 2 is a side view of an embodiment of the backlight module.

Referring to FIG. 2, FIG. 2 illustrates a side view of an embodiment of the backlight module. As shown in FIG. 2, the backlight module 1 includes the reflective plate 10 and a plurality of light sources 20, wherein the reflective plates 10 have reflective surfaces 11. The light sources 20 are disposed on the reflective surface 11, generating light in a direction away from the reflective surface 11. The reflective surface 11 includes a plurality of low reflection portions 100A, wherein the reflectivity of the low reflection portion 100A is lower than the reflectivity of other positions on the reflective surface 11 and the low reflection portion 100A is positioned within an area formed by the light source 20 and adjacent light sources 20. Specifically, the area formed by the light source 20 and adjacent light sources 20 is defined as the interval sectioning between two adjacent light sources 20. For instance, a first light source 210 and a second light source 220 are adjacent light sources disposed on the reflective surface 11, wherein the low reflection portion 100A disposed within a first area 22 between the first light source 210 and the second light source 220. However, the low reflection portion 100A is not necessarily limited to being disposed on the line connecting the first light source 210 and the second light source 220.

In the present embodiment, the low reflection portion 100A includes at least an opening. In other words, the low reflection portions 100A are formed through forming gouges or holes on the reflective surface 11 into the openings. In practice, the opening has a reflectivity lower than other positions on the reflective surface 11 such that light reflection may be decreased.

In addition, the light sources 20 include corresponding lens 30, wherein the lens 30 are disposed on the reflective surface 11 covering their corresponding light sources 20. The top of every lens 30 is depressed toward the direction of the light source 20 such that a light-emitting angle of light from the light source 20 is relatively wider. The backlight module 1 further includes an optical layer 40 disposed above the light sources 20 facing the reflective surface 11, wherein the optical layer 40 has a diffusion plate 410 and at least an optical film 420. When light is emitted from the light sources 20, the lens 30 evenly guides the light to the optical layer 40.

In the present embodiment, the diffusion plate 410 has a plurality of diffusion dots. The diffusion dots are kernels that have different reflectivity to help increase the evenness of light. However, in other embodiments, the diffusion plate 410 may include non-kernel microstructures that are formed on the surface of the diffusion plate 410 or within the diffusion plate 410 itself.

As shown in FIG. 2, a spacing H is the distance from the reflective surface 11 to the optical layer 40 while a closest straight-line distance P is the shortest distance of any two of the light sources 20 passing through the low reflection portion 100A. For instance, the closest straight-line distance P is the shortest distance between the first light source 210 and the second light source 220 that passes through the reflection portion 100A. A first ratio (H/P) of the spacing H from the reflective surface 11 to the optical layer 40 and the closest straight-line distance P is not greater than 0.3.

When the first ratio is 0.3, a second ratio (W/P) of a largest width W of the low reflection portion 100A and the closest straight-line distance P of any two light sources passing through the low reflection portion 100A is between 0.12 and 0.2.

It should be noted that the light source 20 has an intensity peak within a light-emitting angle 200 between 60-80 degrees from the normal line of the reflective surface 11. However, in a preferred embodiment, the light-emitting angle 200 of the intensity peak is smaller than 74 degrees from the normal line of the reflective surface 11. As shown in FIG. 2, the first light source 210 and the second light source 220 separately emit light with both having intensity peaks within the light-emitting angle 200 between 60 and 80 degrees from the normal line of the reflective surface 11. In practice, bright spots are formed from the aggregation of light from the intensity peaks on the optical layer 40. In a preferred embodiment, the low reflection portion 100A is between the first light source 210 and the second light source 220, near the aggregation of light. The reflectivity of the low reflection portion 100A is lower than the reflectivity of other positions on the reflective surface 11 such that light being reflected twice in specific areas may be decreased, subsequently reducing the light aggregation of bright spots and improving the light unevenness phenomenon.

In practice, when the backlight module 1 undergoes development for a slimmer and lighter version, the spacing H between the reflective surface 11 and the optical layer 40 becomes smaller. In addition, light emitted from two adjacent light sources 20 have intensity peaks within the light-emitting angle 200 between 60 and 80 degrees from the normal line of the reflective surface 11. As shown in FIG. 2, when the spacing H becomes smaller while the distance P remains unchanged, light corresponding to the intensity peaks do not easily converge and aggregate on the optical layer 40, resulting in less noticeable bright spots forming. Consequently, low reflective portions 100A with smaller surface areas may be utilized to raise the overall light evenness or smoothness. For instance, when the first ratio (H/P) is 0.28, the second ratio (W/P) of the largest width W of the low reflection portion 100A and the closest straight-line distance P of any two light sources 20 passing through the low reflection portion 100A is between 0.08 and 0.14. In addition, in a different embodiment, when the first ratio (H/P) is 0.26, the second ratio (W/P) of the largest width W of the low reflection portion 100A and the closest straight-line distance P of any two light sources 20 passing through the low reflection portion 100A is between 0.04 and 0.1.

Figure 3:
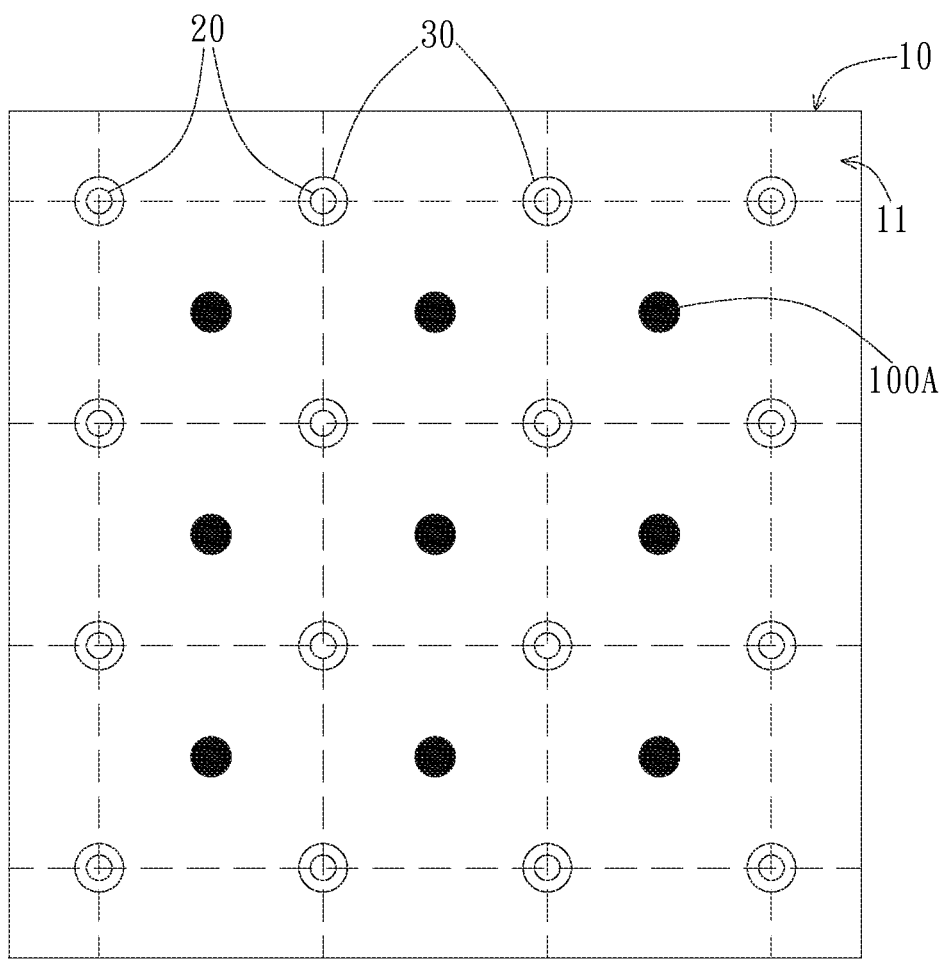
FIG. 3 is a top view of the backlight module.

FIG. 3 illustrates a top view embodiment of the backlight module of the present invention. As shown in FIG. 3, the plurality of light sources 20 are distributed in a lattice pattern and disposed on nodes of the lattice pattern with each low reflection portion 100A being disposed within a lattice of the lattice pattern. In practice, as the distribution density of the light sources 20 raises, the light evenness of the backlight module 1 also raises, which results in less noticeable light unevenness. However, when the amount of light sources 20 increases, the associated material costs also increases. Therefore, under the pretense of not increasing the amount of light sources 20, although the distribution density is not relatively as high, the present invention can still increase light evenness through use of the low reflection portions 100A that are in the lattices of the lattice patterns formed by adjacent light sources 20. Through this, decrease material costs may thereby subsequently be decreased in the process.

In addition, other embodiments other than forming the low reflection portions 100A from openings to improve the light unevenness phenomenon are provided by the present invention.

Figure 4:
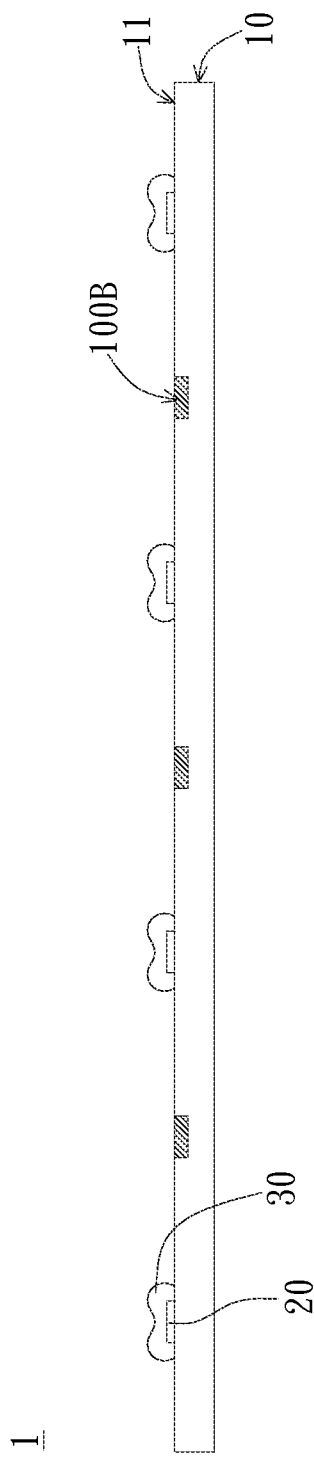
FIG. 4 is a side view of another embodiment of the backlight module.

FIG. 4 illustrates a side view of another embodiment of the backlight module of the present invention. As shown in FIG. 4, the reflective plate 10 includes a plurality of low reflection portions 1008, wherein the low reflection portions 100B include light absorption materials filling the openings. As an example, the light absorption material may be selected from black resin, gray resin, black ink, gray ink, black glial, gray filming/coating, black filming/coating, or any other materials or combination of the above materials that can absorb light or decrease reflectivity. In application, when light reaches the low reflection portions 100B having the light-absorption materials, the low reflection portions 100B is able to absorb the light and subsequently improve the bright spots phenomenon.

In the embodiments of FIGS. 2 and 4, the low reflection portion 100A and low reflection portion 100B separately utilize the opening and filling the opening with light absorption materials to increase light evenness. In addition, the present invention may also accomplish the same results through structures of the low reflection portions having no openings.

Figure 5:
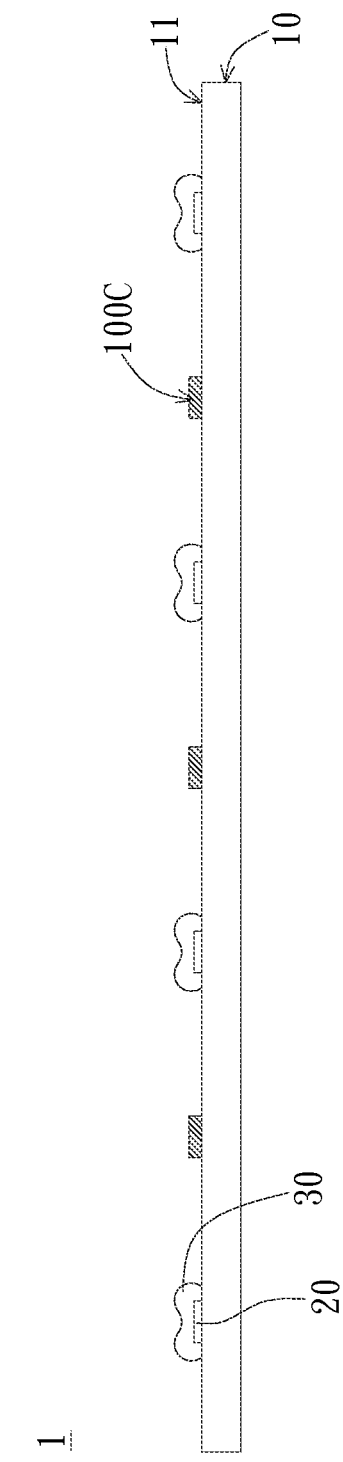
FIG. 5 is a side view of another embodiment of the backlight module.

FIG. 5 illustrates a side view of another embodiment of the backlight module of the present invention. As shown in FIG. 5, the reflective surface 11 includes a plurality of low reflection portions 100C, wherein the low reflection portions 100C includes at least a printed pattern with the printed pattern including a light absorption material. In other words, the light absorption material is printed onto the low reflection portions 100C between the light source 20 and adjacent light sources 20 to decrease the reflectivity. In other different embodiments, the low reflection portions 100A, 1008, and 100C may be disposed on the same reflective plate 10 such that the backlight module 1 may use any combination of the above to satisfy real conditions in order to improve the light unevenness phenomenon.

Figure 6:
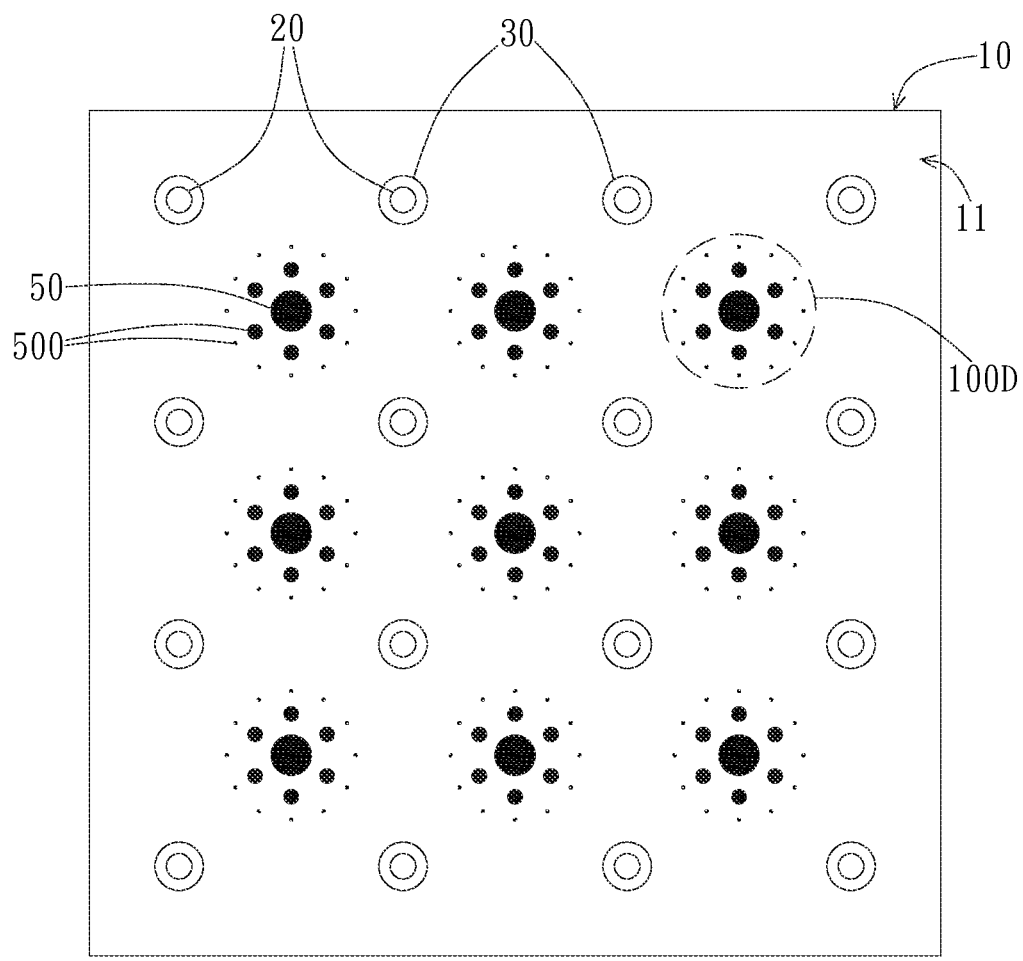
FIG. 6 is a top view of another embodiment of the backlight module.

FIG. 6 illustrates a top view of another embodiment. As shown in FIG. 6, the reflective surface 11 includes a plurality of low reflection portions 100D, wherein each low reflection portion 100D includes a main light absorption portion 50 and at least an auxiliary light absorption portion 500 adjacent to the main light absorption portion 50. In the present embodiment, the auxiliary light absorption portion 500 includes a plurality of light absorption dots, wherein the surface area of each absorption dot is smaller than the surface area of the main light absorption portion 50. In addition, there is no specific limitation set for the main light absorption portion 50 and the auxiliary light absorption portion 500 as they may utilize openings or different materials with light absorbing properties. Each main light absorption portion 50 is disposed on the reflective plate 10 where bright spots are most prominent while the auxiliary light absorption portion 500 is disposed on the reflective plate 10 where bright spots are second most prominent. Specifically, the closer the distance is to the light source 20, bright spots will gradually decrease above the reflective plate 10 as a consequence of the surface area of the light absorption dots closer to the light source 20 being smaller than the surface area of the light absorption dots that are closer to the main light absorption portion 50. In other words, through changes in the surface area of the main light absorption portion 50 and the auxiliary light absorption portion 500, the backlight module 1 can effectively decrease the effects of the bright spots phenomenon and increase the evenness of light.

Figure 7:
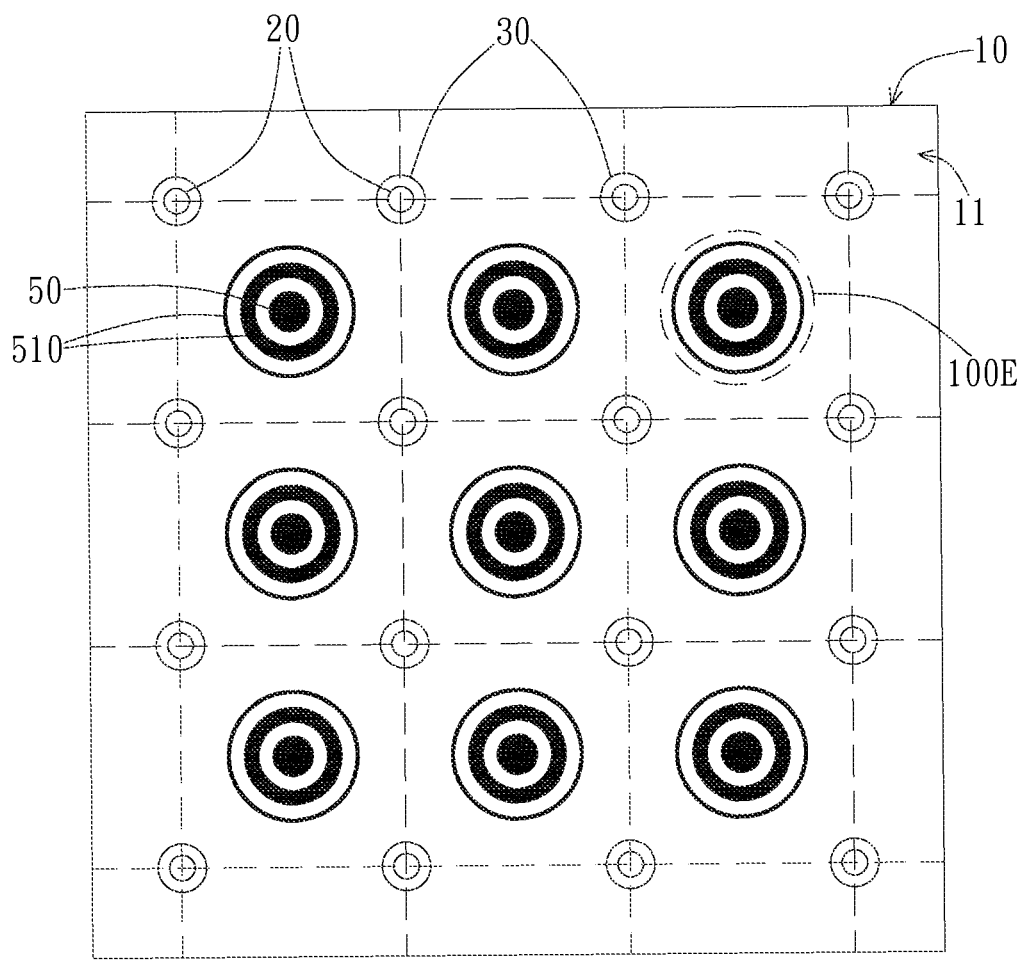
FIG. 7 is a top view of another embodiment of the backlight module.

FIG. 7 illustrates a top view of another embodiment of the backlight module of the present invention. As shown in FIG. 7, the reflective surface 11 includes a plurality of low reflection portions 100E, wherein the low reflection portion 100E includes the main light absorption portion 50 and at least an auxiliary light absorption portion 510. The auxiliary light absorption portion 510 is formed from at least a light absorption ring, wherein the diameter of the main light absorption portion is greater than a ring width of the light absorption ring. In addition, the light absorption ring may be selected from different materials with light absorbing properties or may be formed from openings as no limitations has been set.

In the present embodiment, the auxiliary light absorption portion 510 formed in the form of rings may be formed from a combination of the mentioned light absorption dots. In other words, through the light absorption dots, the light absorption rings surrounds the main light absorption portion 50 with different diameters but with the same center point such that different light absorption rings are formed.

In the present embodiment, the plurality of light sources 20 are distributed in a lattice pattern and disposed on nodes of the lattice pattern with each low reflection portion 100E being disposed within a lattice of the lattice pattern. In practice, the main light absorption portion 50 and the at least one auxiliary light absorption portion 510 share the same center point, wherein the center point is centered within each lattice of the lattice pattern. In other words, the main light absorption portion 50 is positioned where bright spots are most prominent while the auxiliary light absorption portion 510 is disposed on the reflective surface 11 where bright spots are second most prominent. In more concrete terms, the closer the distance is to the light source 20, the bright spots above the reflective surface 11 gradually decrease as a result of the ring width of light absorption rings closer to the light source 20 being thinner than the ring width of the main light absorption portion 50. In other words, the low reflection portion 100E of FIG. 7 effectively decreases the effects of the bright spots phenomenon and increases light evenness through changes in the ring width of the main light absorption portion 50 and the auxiliary light absorption portion 510.

Figure 8:
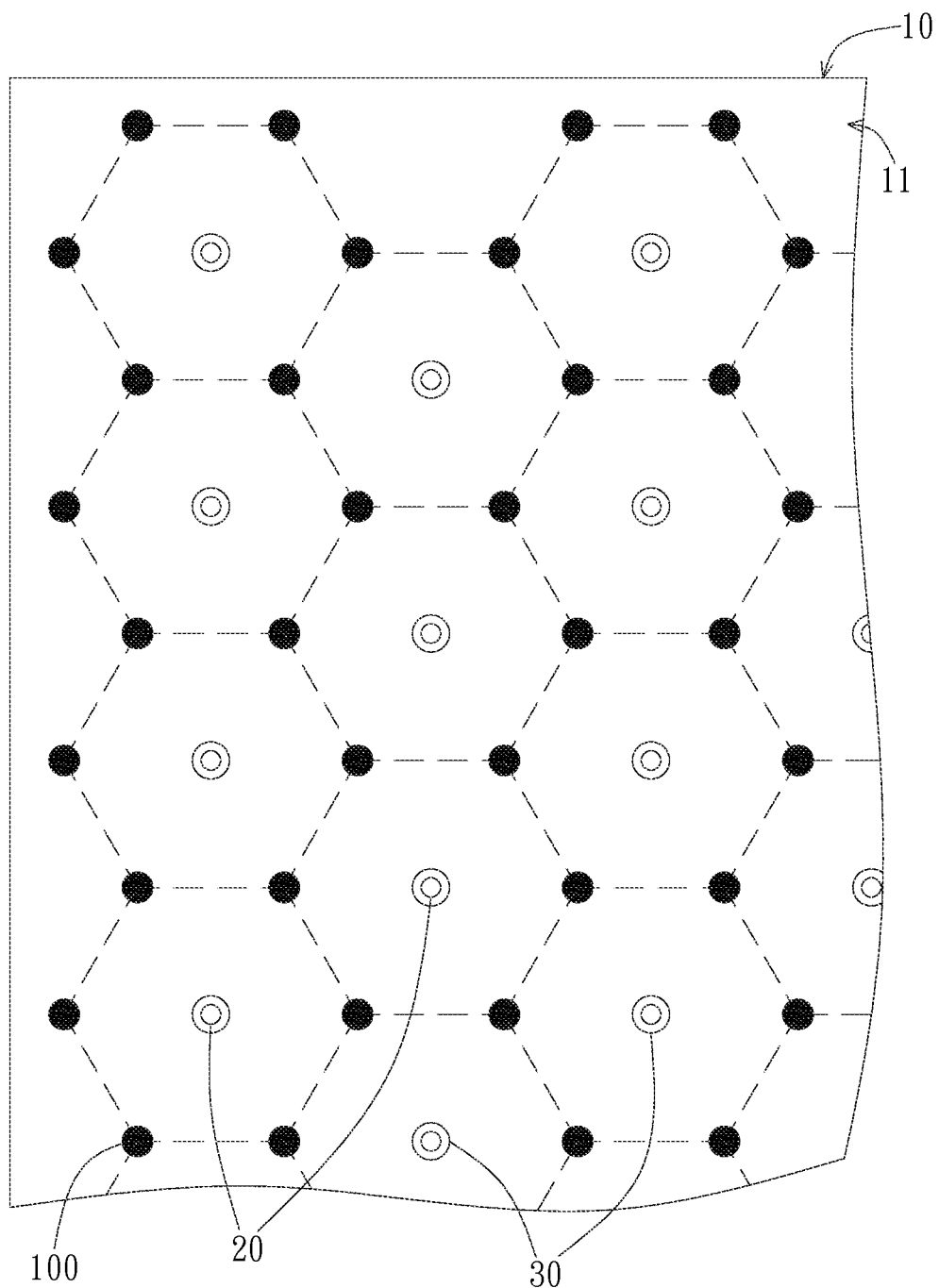
FIG. 8 is a top view of a variation of the backlight module.

FIG. 8 illustrates a top view of another embodiment. As shown in FIG. 8, a backlight module 2 includes a reflective plate 10 and a plurality of the light sources 20, wherein the reflective plate 10 has the reflective surface 11 and a plurality of low reflection portions 100 are formed on the reflective surface 11. The plurality of low reflection portions 100 have a reflectivity lower than other positions on the reflective surface 11. The low reflection portions 100 may be the low reflection portions 100A-100E of FIGS. 2-7, or any combination of them without restriction.

As shown in FIG. 8, the light sources 20 are disposed on the reflective surface 11 and emit light in a direction away from the reflective surface 11. In addition, the light source 20 further includes a plurality of the lens 30, wherein the lens 30 is disposed on the reflective surface 11 and covers the corresponding light source 20. The top of each lens 30 is depressed toward the light source 20 to allow a wider light-emitting angle for better light emitting efficiency. At least a portion of the light source 20 is surrounded by a plurality of the low reflection portions 100. In the present embodiment, the low reflection portions 100 form hexagonal shapes that surround corresponding light sources 20, wherein the low reflection portion 100 is disposed on the reflective surface 11 where bright spots are most prominent so as to decrease the bright spots phenomenon. However, in other embodiments, the low reflection portions 100 may be organized in other ways to surround corresponding light sources 20, such as pentagonal or other polygonal shapes.

Figure 9:
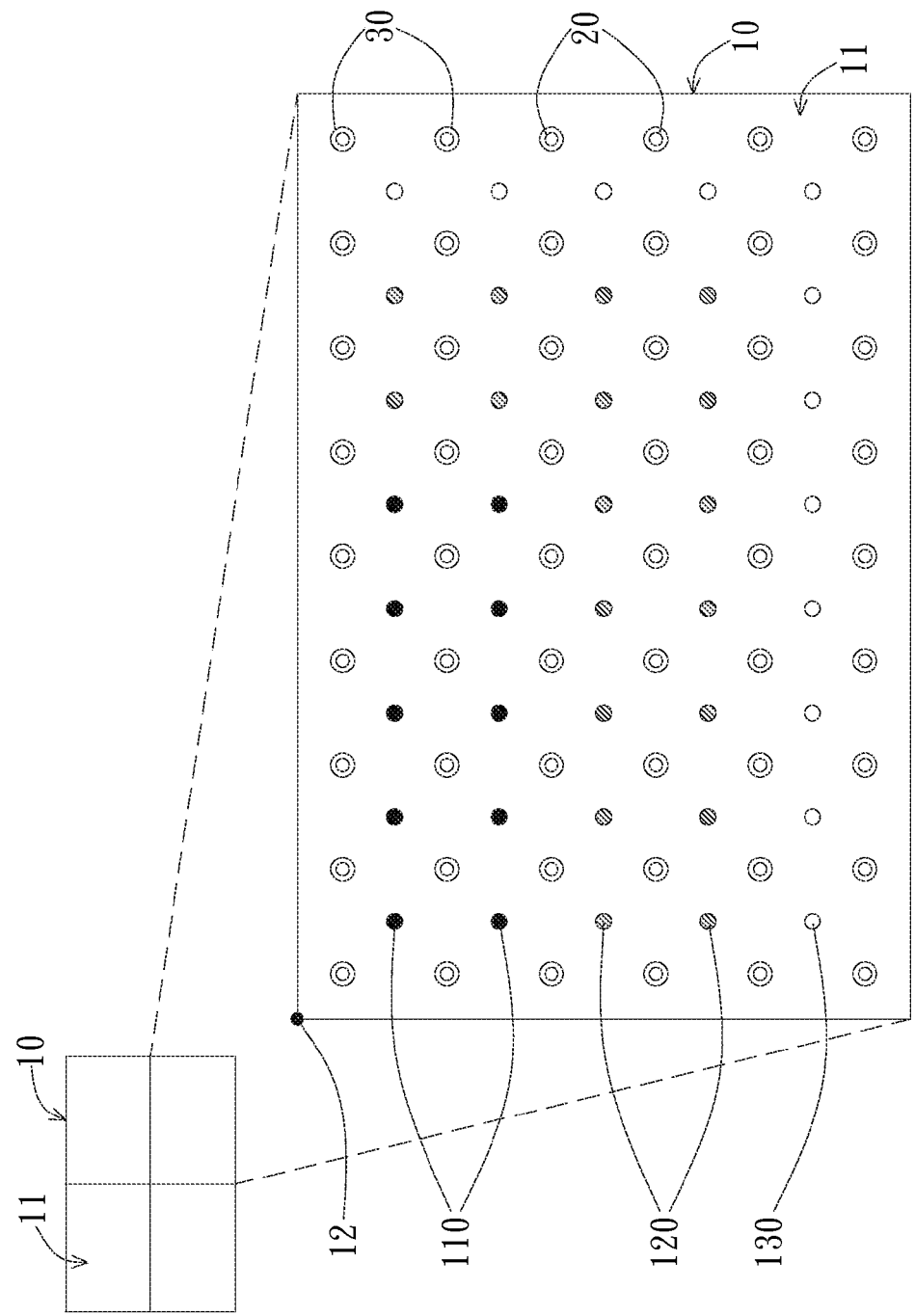
FIG. 9 is a top view of another embodiment of the backlight module.

FIG. 9 illustrates a top view of another embodiment of the backlight module of the present invention. As shown in FIG. 9, a backlight module 3 includes a plurality of the light sources 20 and a plurality of low reflection portions 110, 120, and 130, wherein the light source 20 include corresponding lens 30. In the present embodiment, the reflectivity of the low reflection portions 110, 120, and 130 is lower than the reflectivity of other positions on the reflective surface 11.

As shown in FIG. 9, the backlight module 3 is divided into 4 areas with center point 12 as the center. In terms of the $4^{th}$ area as an example, the light sources 20 and their corresponding lens 30 are disposed on the reflective surface 11 of the reflective plate 10, wherein the low reflection portions 110, 120, and 130 are disposed in the area between the light source 20 and adjacent light sources 20. Among the low reflection portions, the reflectivity is lower for those closer to the center of the reflective surface 11. For instance, the low reflection portion 110 (shown as a solid circle) has a reflectivity lower than the low reflection portion 120 (shown as dotted-line circle), while the reflection portion 120 has a reflectivity lower than the low reflection portion 130 (shown as regular circle). In application, positions on the reflective surface 11 closer to the center point 12 have higher brightness than positions closer to the boundaries of the reflective surface 11. Therefore, the low reflection portions 110 disposed at the center point 12 on the reflective surface 11 can decrease relatively more the brightness to allow the backlight module 3 to have greater light evenness. Correspondingly, the low reflection portion 130 disposed at the boundaries of the reflective surface 11 decrease relatively less brightness and thus allows the backlight module 3 to produce softer overall light.

Figure 10:
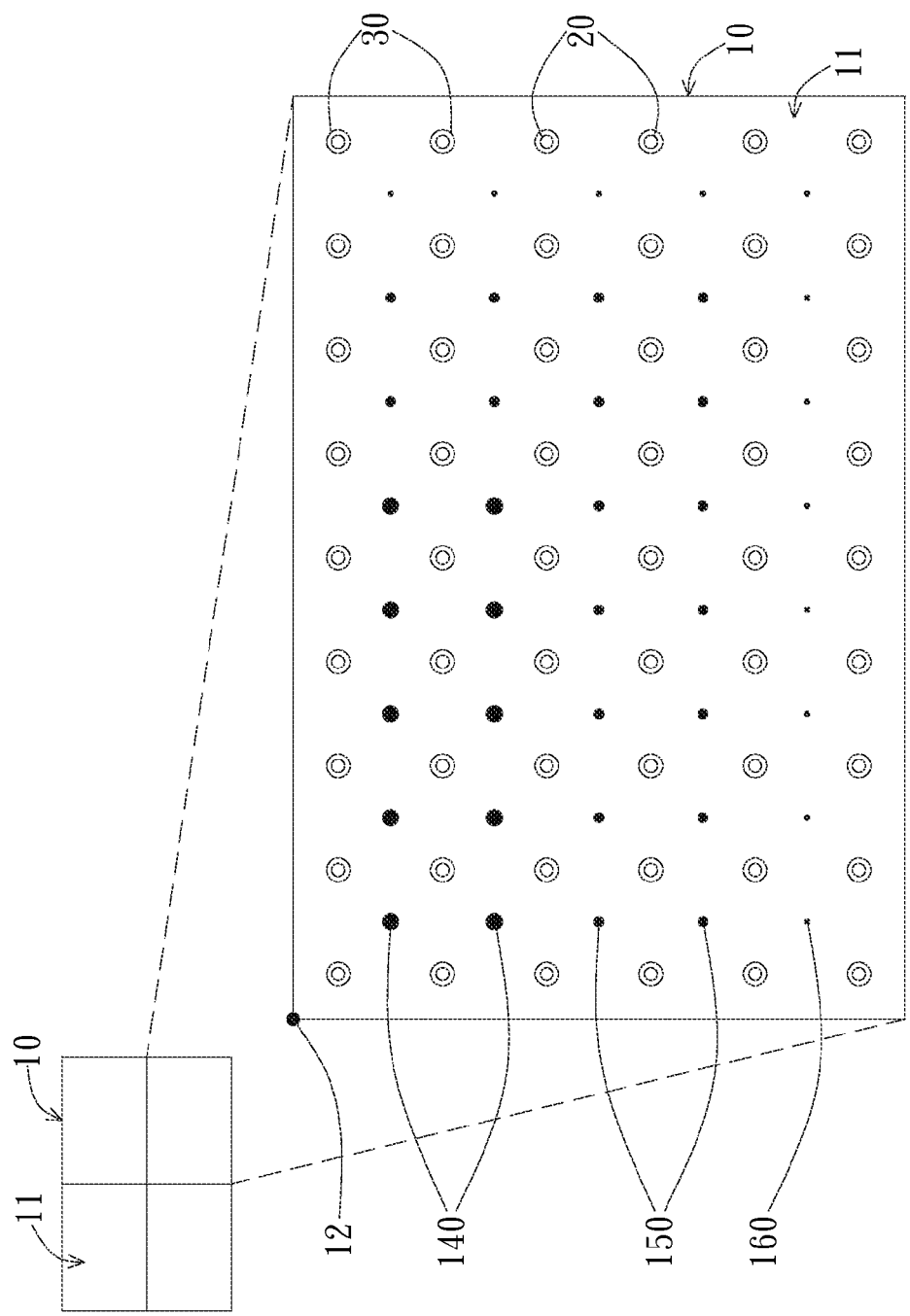
FIG. 10 is a top view of another embodiment of the backlight module.

FIG. 10 illustrates a top view of another embodiment of the backlight module of the present invention. As shown in FIG. 10, in comparison to the embodiment of FIG. 9, the reflective surface 11 includes low reflection portions 140, 150, and 160. Among the low reflection portions, the low reflection portions closer in proximity to the center point 12 have relatively larger surface area. In the present embodiment, the low reflection portions are organized based on having the biggest surface area to the smallest surface area; namely, in the order of low reflection portion 140, low reflection portion 150, and then low reflection portion 160. Low reflection portions with larger surface areas have lower reflectivity. In other words, the low reflection portions 140 have lower reflectivity than the low reflection portions 150, while the low reflection portions 150 have lower reflectivity than the low reflection portions 160. The backlight module increases light evenness through changes in the surface area of the low reflection areas to accomplish producing softer light.

Figure 11:
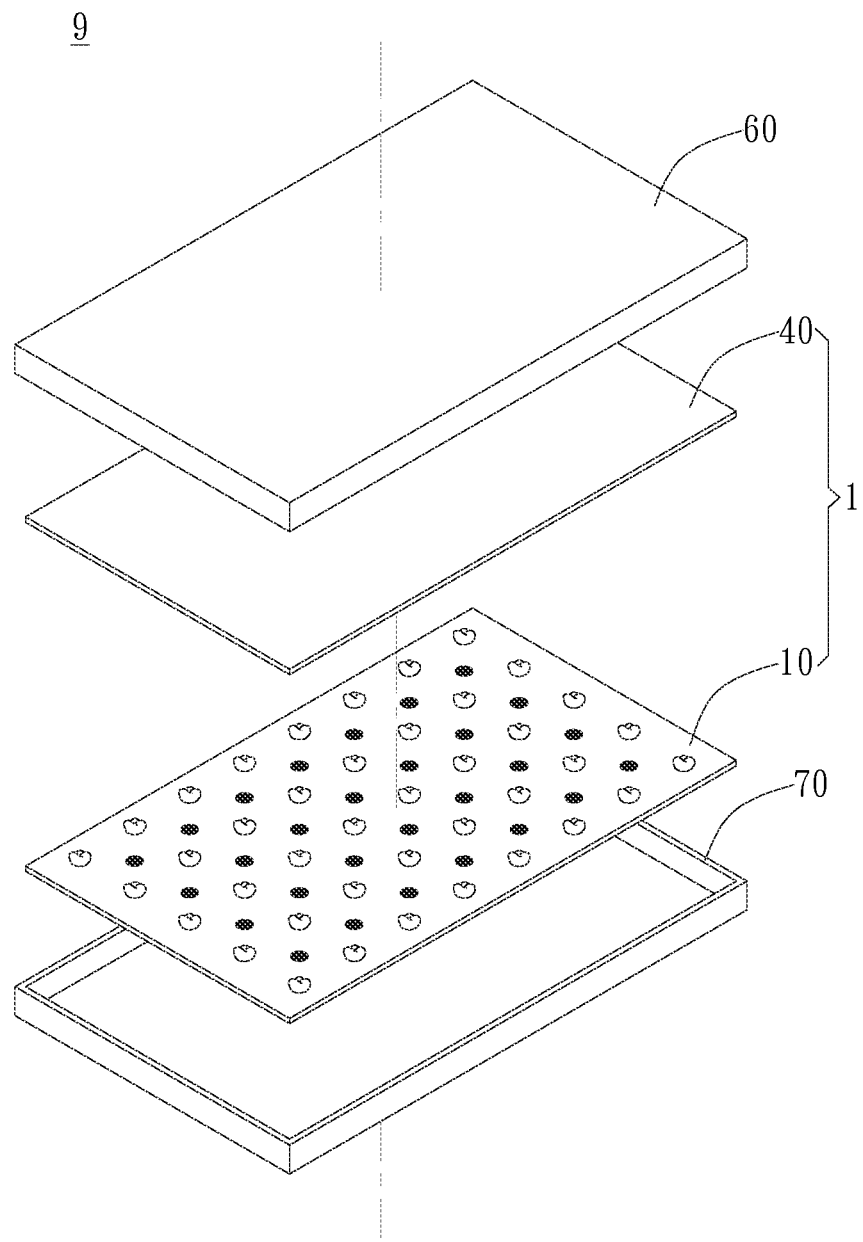
FIG. 11 is an embodiment of the display device of the present invention.

FIG. 11 illustrates an embodiment of a display device of the present invention. The display device 9 includes a display panel 60, the backlight module 1, and a bottom plate 70, wherein the backlight module 1 has the reflective plate 10 and the optical layer 40. In other words, the backlight module 1 is the backlight source of the display panel 60. The display device 9 may include any one of the above mentioned embodiments of the backlight module. When light is emitted out through the lens 30 from the light source 20, light evenness is accomplished through the low reflection portions changing the reflectivity at different areas on the reflective surface 11.

It is an object of the disclosed embodiments to provide a backlight module and a display device that can decrease the manufacturing cost as well as improve light efficiency. It is another object of the disclosed embodiments to provide a backlight module and a display device that utilizes low reflection portions to increase the light evenness. It is yet another object of the disclosed embodiments to provide a backlight module and a display device with adjustable reflectivity to improve the bright spots phenomenon. It is a further object of the disclosed embodiments to provide a backlight module and a display device that utilizes less light sources to decrease the material costs.

In comparison to the prior art, the backlight module and display device of the disclosed embodiment utilizes the fact that the low reflection portions on the reflective surface have lower reflectivity compared to other positions on the reflective surface to decrease the amount of light being reflected by the low reflection portions such that bright spots phenomenon are not easily produced. In an embodiment of the invention, the low reflection portion may include openings that may or may not be filled with different materials to decrease the reflectivity and improve the light unevenness problem. In addition, large dimensioned display device may also increase their display quality through use of the low reflection portions of the reflective surface. Without increasing the amount of light sources, large dimensioned display devices may improve their light unevenness problem through the above mentioned low reflection portions while also greatly cutting down on the material costs required for increasing the amount of light sources.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A backlight module, comprising:
a reflective plate having a reflective surface; and
a plurality of light sources disposed on the reflective surface, the light sources emitting light in a direction away from the reflective surface, wherein the light sources are point light sources;
wherein the reflective surface comprises a plurality of low reflection portions disposed in an area formed by adjacent light sources, the reflectivity of the low reflection portions is lower than the reflectivity of other positions of the reflective surface, and at least one of the low reflection portions comprises a main light absorption portion and an auxiliary light absorption portion adjacent to the main light absorption portion.

2. The backlight module of claim 1, wherein the light sources are distributed in a lattice pattern and disposed on nodes of the lattice pattern, each low reflection portion is disposed within a lattice of the lattice pattern.

3. The backlight module of claim 1, wherein among the plurality of low reflection portions, the low reflection portion closer to the center of the reflective surface has a larger area.

4. The backlight module of claim 1, wherein among the plurality of low reflection portions, the low reflection portion closer to the center of the reflective surface has a lower reflectivity.

5. The backlight module of claim 1, wherein at least one of the low reflection portions comprises at least an opening or at least a printed pattern.

6. The backlight module of claim 5, wherein at least one of the low reflection portions comprises a light absorption material filling the opening.

7. The backlight module of claim 5, wherein the printed pattern comprises a light absorption material.

8. The backlight module of claim 1, wherein the auxiliary light absorption portion comprises a plurality of light absorption dots, the area of each light absorption point is smaller than the area of the main light absorption portion.

9. The backlight module of claim 1, wherein the auxiliary light absorption portion comprises at least a light absorption ring, the diameter of the main light absorption portion is greater than a ring width of the light absorption ring.

10. The backlight module of claim 1, wherein the light source has an intensity peak within a light-emitting angle between 60 degrees and 80 degrees from the normal line of the reflective surface.

11. The backlight module of claim 10, wherein the light-emitting angle of the intensity peak is smaller than 74 degrees from the normal line of the reflective surface.

12. The backlight module of claim 1, further comprising an optical layer disposed above the light sources facing the reflective surface, wherein a first ratio (H/P) of a spacing (H) from the reflective surface to the optical layer and a closest straight-line distance (P) of any two of the light sources passing through the low reflection portion is not greater than 0.3.

13. The backlight module of claim 12, wherein a second ratio (W/P) of a largest width (W) of the low reflection portion and the closest straight-line distance (P) of any two light sources passing through the low reflection portion is between 0.12 and 0.2 when the first ratio is 0.3.

14. The backlight module of claim 12, wherein a second ratio (W/P) of a largest width (W) of the low reflection portion and the closest straight-line distance (P) of any two light sources passing through the low reflection portion is between 0.08 and 0.14 when the first ratio is 0.28.

15. The backlight module of claim 12, wherein a second ratio (W/P) of a largest width (W) of the low reflection portion and the closest straight-line distance (P) of any two light sources passing through the low reflection portion is between 0.04 and 0.1 when the first ratio is 0.26.

16. A display device, comprising:
a display panel; and
the backlight module of claim 1 providing a light source to the display panel.

17. A backlight module, comprising:
a reflective plate having a reflective surface; and
a plurality of light sources disposed on the reflective surface, the light sources emitting light in a direction away from the reflective surface; and
an optical layer disposed above the light sources facing the reflective surface;
wherein the reflective surface comprises a plurality of low reflection portions disposed in an area formed by adjacent light sources, the reflectivity of the low reflection portions is lower than the reflectivity of other positions of the reflective surface, and a first ratio (H/P) of a spacing (H) from the reflective surface to the optical layer and a closest straight-line distance (P) of any two of the light sources passing through the low reflection portion is not greater than 0.3.

18. The backlight module of claim 17, wherein a second ratio (W/P) of a largest width (W) of the low reflection portion and the closest straight-line distance (P) of any two light sources passing through the low reflection portion is between 0.12 and 0.2 when the first ratio is 0.3.

19. The backlight module of claim 17, wherein a second ratio (W/P) of a largest width (W) of the low reflection portion and the closest straight-line distance (P) of any two light sources passing through the low reflection portion is between 0.08 and 0.14 when the first ratio is 0.28.

20. The backlight module of claim 17, wherein a second ratio (W/P) of a largest width (W) of the low reflection portion and the closest straight-line distance (P) of any two light sources passing through the low reflection portion is between 0.04 and 0.1 when the first ratio is 0.26.

* * * * *